United States Patent Office 3,101,850
Patented Aug. 27, 1963

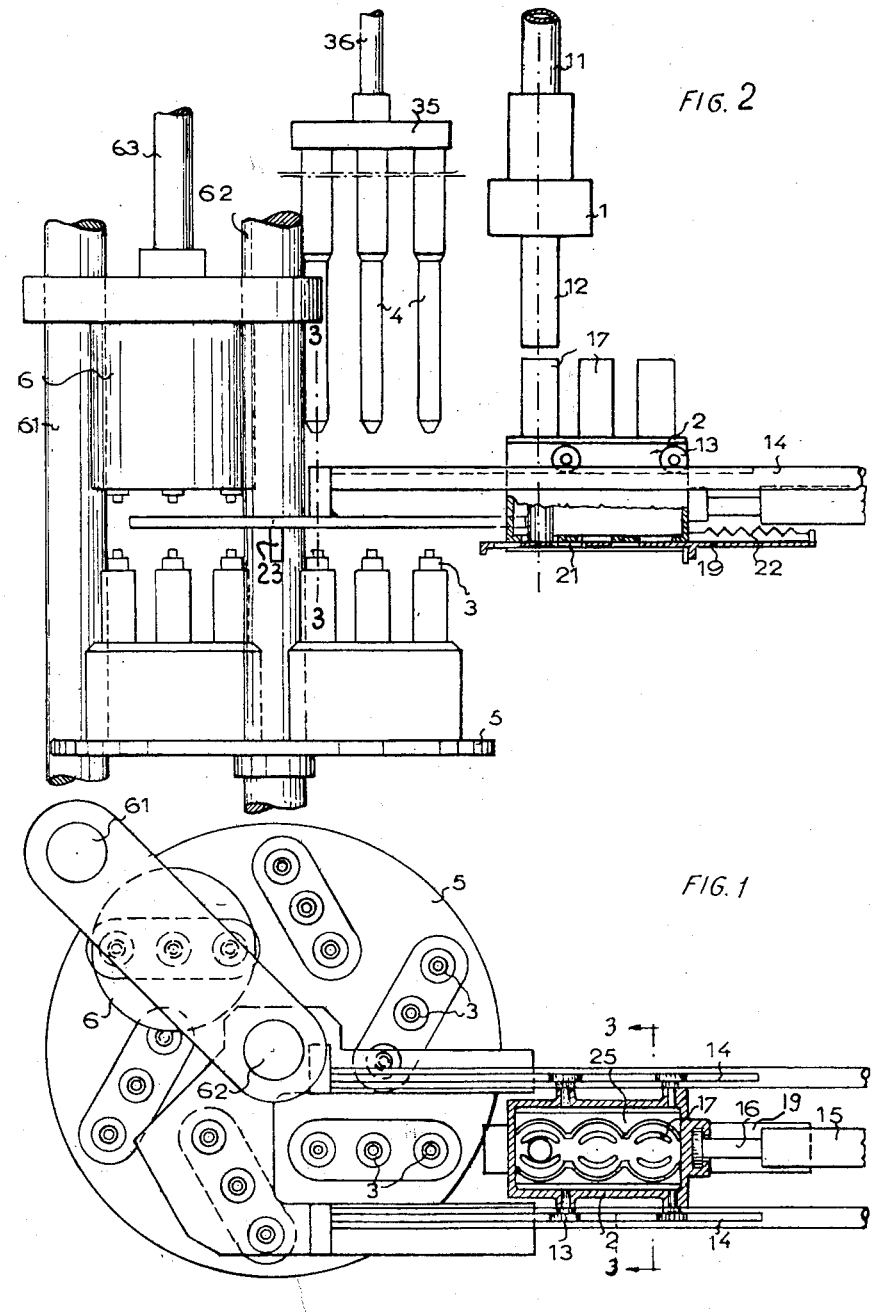

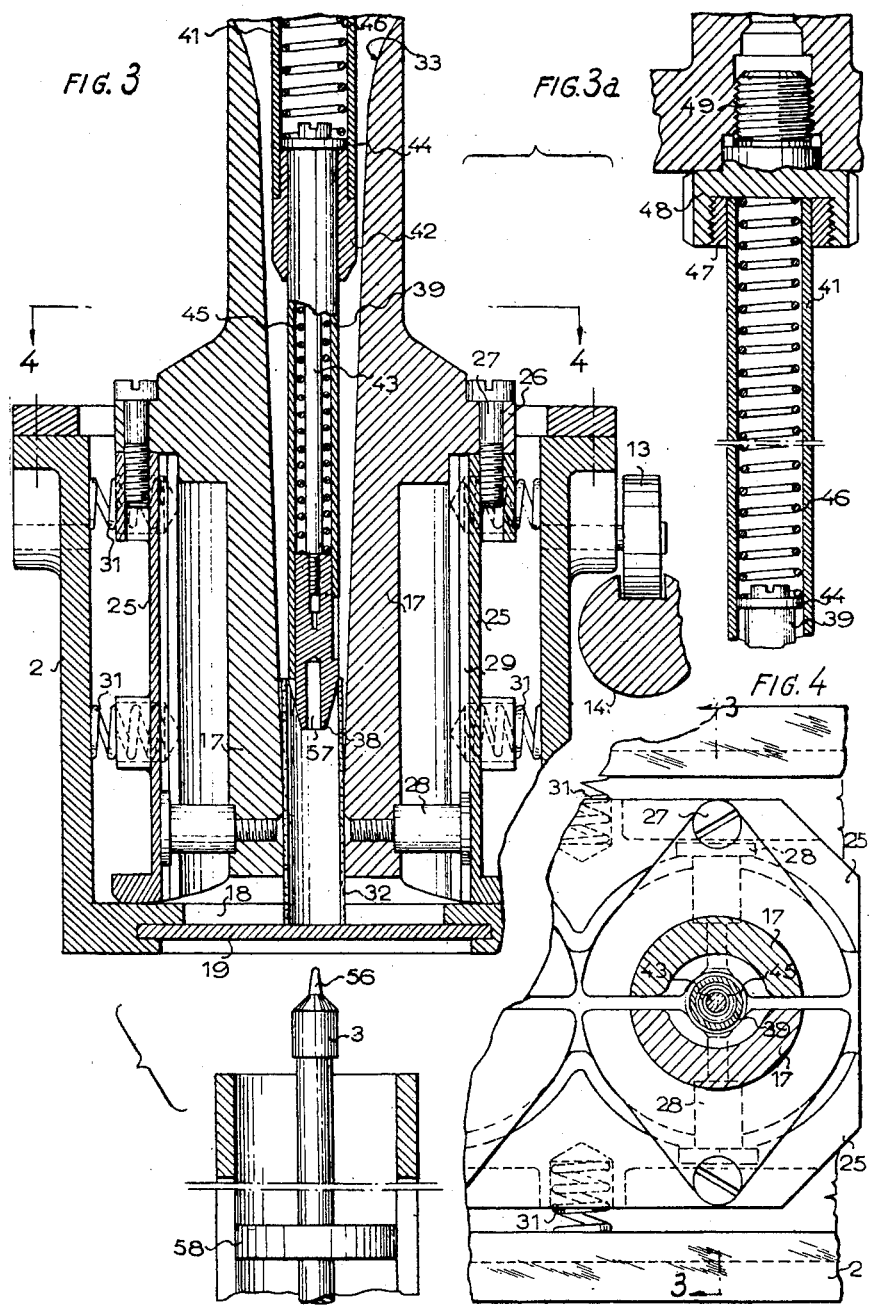

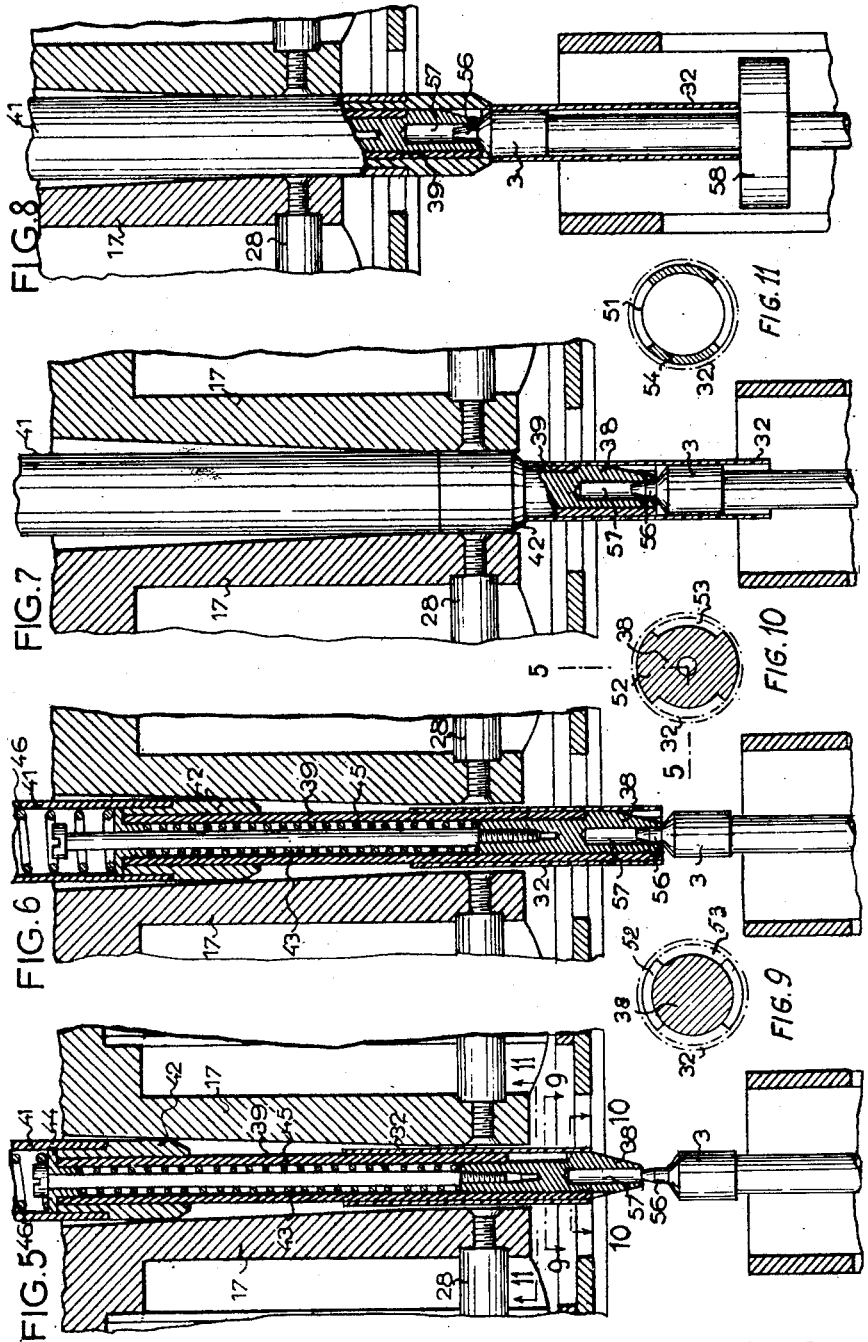

3,101,850
TELESCOPING OF FLEXIBLE TUBULAR ELEMENTS ON TO MANDREL LIKE SUPPORTING MEMBERS
Albert Quinche, St-Sulpice, Switzerland, assignor, by mesne assignments, to American Can Company, New York, N.Y., a corporation of New Jersey
Original application Feb. 7, 1957, Ser. No. 638,792. Divided and this application May 2, 1961, Ser. No. 108,706
13 Claims. (Cl. 214—1)

This invention relates to the telescoping of flexible tubular elements, i.e., short lengths of flexible tubing on to mandrel-like supporting members.

One object of the invention is to telescope flexible tubular elements onto rigid cylindrical supports by means of transfer members, in such a manner that, during the whole telescoping operation, the tubular elements be permanently and conveniently supported and guided along each of their generatrices.

Another object of the invention is to telescope flexible tubular elements onto rigid cylindrical supports on which they have an accurate or close fit, by means of transfer members previously inserted into said tubular elements with a free sliding fit.

Another object of the invention is to telescope flexible tubular elements onto rigid supporting mandrels by a novel method having advantages of speed, ease and certainty of operation and elimination of waste movements.

A further object of the invention is to provide an apparatus for carrying out the above-cited method.

Still a further object of the invention is in telescoping tubular elements of "plastic" material on to the male dies of an injection-moulding machine in preparation for the formation, by injection-moulding, of integral heads on said elements; but it is to be understood that the invention is in no way limited to this particular object.

Another object of the invention is an apparatus for carrying out the method above-described, such apparatus comprising an open-ended tubular receiver into which a tubular element can be inserted axially and which is appropriately shaped and dimensioned to locate said element when fully inserted, its internal diameter being slightly tapering from the input end, a closure movable, from a position in which it obstructs the open narrow end of said tubular receiver and serves as an abutment for the leading end of said tubular element, to a position in which it exposes said open end and, conversely, a transfer mandrel alined with said support and axially movable to enter the wide end of said tubular receiver, when said receiver is alined with said support, and to pass through said receiver to apply its extremity against the extremity of said support, and in the course of such displacement to insert itself in said tubular element and carry the same forward, and means for causing the said tubular element to slide off from the transfer mandrel on to the support.

A further object of the invention is to provide for a compact arrangement of the above-mentioned structural elements and for continuous operation thereof by mounting the receiver on a carriage horizontally displaceable, from a position beneath a feeding head adapted successively to supply tubular elements by gravity endwise into said receiver, to a position in which said receiver is beneath the transfer mandrel (when in raised position) and above the support, being aligned with both, and conversely.

To facilitate rapidity and continuity of operation, the carriage may have a number of receivers mounted therein, which can be brought successively beneath the feeding head by displacing the carriage horizontally, and a corresponding number of supports and transfer mandrels may be provided, with which the several receivers of the carriage can be brought simultaneously into alinement.

Still further objects and features of the invention will appear in the following description of an embodiment of the invention as applied to a machine for injection-moulding integral heads on tubular elements made of plastic material, having reference to the accompanying drawings, such embodiment being described by way of example only and without implied limitation of the scope of the invention which is defined in the hereto appended claims.

In the drawings,

FIGURE 1 is a schematic plan of an apparatus for telescoping short tubes made of "plastic" material on to the male dies of a machine for moulding a head on each of these tubes, by injection.

FIGURE 2 is a corresponding view in elevation, in which, for ease of reading the drawing, only those male dies are shown which are in the feeding and moulding positions.

FIGURES 3 and 3a are a section on an enlarged scale on the line 3—3 of FIGURES 1 and 4, FIGURE 3a being the prolongation of the upper part of FIGURE 3.

FIGURE 4 is a horizontal section on the line 4—4 of FIGURE 3.

FIGURES 5, 6, 7 and 8 are partial vertical sections analogous to that of FIGURE 3 illustrating the telescoping of tubes of plastic material on to the male dies in four successive phases of work, and FIGURES 9, 10 and 11 are horizontal sections on an enlarged scale on the lines 9—9, 10—10 and 11—11 of FIGURE 5 respectively.

In order to illustrate the main feature of this invention, without limiting its scope, reference is made to FIGURES 1 and 2, wherein there is illustrated a machine for forming heads on tubes made of plastic material by injection. This machine comprises essentially: a distributor 1 for delivering the tubes made of plastic material, hereinafter referred to as "tubular elements" or "elements," a conveyor carriage 2 designed to bring these elements opposite a plurality of male dies 3 which will support the tubular elements during the operation of moulding the head, a group of transfer mandrels 4 which serve to telescope these elements on to male dies, and a horizontal rotary plate 5 supporting several groups of such dies 3 to cause them to pass successively under the transfer mandrels 4 and under an injection-moulding head 6.

The distributor 1 is preceded by a feeding device (not illustrated) of an appropriate conventional type which brings the tubular elements one behind the other into an intake duct 11 of the distributor 1. The latter comprises a mechanism (not illustrated) capable of releasing the elements, one by one, through an outlet tube 12.

The conveyor carriage 2 has four wheels 13 (see also FIGURES 3 and 4) which roll on two parallel rails 14. The displacements of the carriage along these rails are effected in this example by a hydraulic control device comprising a cylinder 15 and a piston 16 attached to the carriage 2.

The body of the carriage, in the form of a generally rectangular box, contains three groups of two half-shells 17 of generally semicylindrical form with vertically disposed axes. The base of the carriage is pierced by three circular openings 18 respectively disposed on the axes of the shells and adapted to be closed by a sliding shutter 19 disposed below the base of the carriage. Shutter 19 is likewise pierced by three openings 21 at the same centres as the openings 18 of the base of the carriage. When the shutter is at the end of its travel to the left of the carriage 2 (as seen in FIGURES 1 and 2) the openings of the base of the carriage are closed by the shutter, while when it is at the other end of its travel its openings and those of the base of the carriage are in register.

The shutter 19 is biased towards its closed position by a spring 22. It extends outside the carriage 2 on the left-hand side in FIGURE 2. This projecting extremity of the shutter is designed to engage a fixed abutment 23, rigid with the member supporting the rails 14, when the carriage 2 reaches the end of its travel to the left.

The two half-shells 17 of each pair of half-shells are respectively carried by two common shell-supports 25 (see FIGURE 3). Each half-shell is furnished with a lug 26 through which passes a screw 27 screwed into the upper part of the shell-support 25. Screwed to the lower part of each half-shell is a plug 28 whose wide, thin head can slide in a vertical T-section slot formed in the vertical internal wall of the shell-support. In this way the upper part of each half-shell is held by a screw 27, and its lower part by a plug 28, which render it rigid with the corresponding shell-support, while making it easily removable upwards, merely by taking out the screws.

The two shell-supports are biased towards each other by compression springs 31 interposed between the internal wall of the carriage 2 and the outer wall of the corresponding shell-support, and they rest on the base of the said carriage.

The diameter of the lower part of the bore of the half-shells is actually slightly greater than the outside diameter of the tubular elements (shown at 32), but the half-shells do not extend over a full half-circumference, so that the members of each pair of them can be brought closer to one another sufficiently to enable them to obtain a moderate grip on a tubular element. The bore of the shells is tapered with the larger diameter at the top, which, moreover, is bell-mouthed at 33.

Each of the three mandrels 4 to be inserted into a corresponding shell is constituted by an assembly mounted on a cross-head 35 carried by a rod 36 which can rise and fall axially.

Each mandrel assembly comprises a pointed ferrule 38, a first tube 39 in which the said ferrule can slide and a second tube 41 fast on a second ferrule 42 in which the first tube 39 can slide, so as to form an assembly of three telescopic members, viz. ferrule 38, tube 39 and tube 41.

Inside the first tube 39 is a rod 43 whose lower end is screwed into the center of the ferrule 38 and whose upper end terminates in a head, which abuts on a collar 44 integral with the tube 39 and thus prevents the tube 39 from escaping from the ferrule 42. A compression spring 45 tends to hold the ferrule 38 in the extended position relative to tube 39 and another compression spring 46 tends to hold the tube 39 in the extended position relative to tube 41. The upper end of the tube 41 is fast in a ring 47, which is screwed into a ferrule 48 with a screw-threaded tail 49, which latter is screwed into a corresponding screw-threaded hole in the crosshead 35.

The external diameter of the tube 39 is such that it can easily be inserted into a tubular element 32. In order not to impede this movement, it is indispensable that the thickest part of the ferrule 38 should have exactly the same diameter as the external diameter of the tube 39; on the other hand, for the element 32 to be well guided on its leaving the tube 39, the ferrule 38 must disappear completely into the interior of the tube 39. For this reason the end of the tube 39 has two longitudinal slots 51 (FIGURE 11) in which slide two longitudinal ribs 52 (FIGURE 10) of the ferrule 38, situated between two longitudinal recesses 53 (FIGURE 10) of this ferrule, in which (recesses) the two longitudinal ribs 54 (FIGURE 11) separating the slots 51 of the tube 39, can slide. In FIGURES 9 to 11, the tube 32 of plastic material is shown in chain-dotted lines.

The male dies 3 which support the tubes of plastic material for the operation of moulding the head, are shown on an enlarged scale in FIGURES 3 and 5 to 8. They have such a diameter that the tubular elements may be telescoped thereon with an accurate fit. They comprise a small centering point 56 of tapered form which can penetrate into the interior of an axial hole 57 of corresponding diameter formed in the lower end of the ferrule 38, and a plate 58 on the upper face of which the tubular element 32 can rest.

The injection head 6 is supported on two columns 61 and 62 along which it can slide vertically under the action of a control rod 63, which is rigid with it and is attached, for instance, to the piston of an hydraulic control device (not illustrated). The column 62 also serves to support the rotary plate 5 to which is imparted a movement of intermittent rotation, in the example illustrated, by sixths of a revolution.

The complete cycle of operations of the machine which has just been described is as follows:

At the beginning of the cycle, all parts of the machine occupy the respective positions shown in FIGURES 1 and 2. The tubular elements 32 are in readiness one above the other in the duct 11. Under the action of an appropriate control (not illustrated) the lowest element is freed by the distributor 1 and descends under the action of gravity through the outlet tubing 12 into that one of the shells 17 which then lies just below it and comes to rest on the upper face of the shutter 19 which is in closed position. The conveyor carriage 2 is smartly displaced through a short distance, so that the second shell in turn comes into position just below the outlet tubing 12 of the distributor. A second tubular element is likewise deposited in this second shell. The carriage is again displaced by a small amount to bring the third shell below the distributor which lets fall another element into the third shell. This concludes the first, or distributive, phase.

The carriage 2 with its shells charged with tubular elements 32 moves into position beneath the transfer mandrels 4, at the moment when the carriage nearly reaches said position, the forward end (left end in FIG. 2) of the shutter 19, engages the fixed abutment 23 and, therefore is retracted beneath the carriage, at the same time bringing the three openings 21 respectively into register with the corresponding three openings 18 of the carriage bottom. The three mandrels 4 descend and are respectively inserted in the three tubular elements 32 lodged in the shells (FIGURE 3).

As the mandrels 4 continue to descend the ferrule 42 springs the half-shells apart against the efforts of the springs 31, and the mandrel tube 39 carrying with it the tubular element 32, passes through the openings of the base of the carriage and of the shutter (FIGURE 5). The terminal ferrule 38 of the transfer mandrel centers itself on the central projection 56 of the male die 3 against which it descends and abuts. From this moment the mandrel-supporting cross-head 35, which continues to descend, compels the tube 39 to continue to descend against the effort of spring 45 until the ferrule 38 is completely received into the tube 39 and the longitudinal ribs of ferrule 38 bottom in the longitudinal slots of tube 39. From this moment the tube 39 can descend no further, but the tube 41 continues to descend, compressing the spring 46. The ferrule 42 which is rigid with the tube 41 makes contact with the upper rim of the tubular element 32 and causes it to slide off from the tube 39 and on to the male die 3 (FIGURE 7) until it rests on the plate 58 of die 3 (FIGURE 8). In order that the tubular element may be telescoped on the male die right to the bottom, the travel of the mandrel-supporting cross-head 35 is so regulated that it continues to descend a little further, such excess travel being absorbed by a spring (not illustrated). This completes the telescoping phase.

The cross-head 35 rises rapidly again, raising the transfer mandrels clear of the top of the carriage. The plate 5 then turns through a sixth of a revolution and another group of three male dies 3′ comes into position beneath the transfer mandrels 4. At the same time the conveyor carriage 2 is returned to its initial loading position (FIGURE 2). As soon as it moves to the right, the spring 22 urges the shutter 19 to closed position. After the plate 5 has made two further sixths of a revolution the three male dies 3, on which tubular elements have been telescoped in the way described in detail above, arrive beneath the injection-moulding head 6. The latter descends under the action of the rod 63, and moulds a head integrally on to the upper end of each tubular element.

The injection head rises again and the plate 5 again makes a sixth of a revolution. The now headed tubular elements are then ejected. After the next sixth of a revolution, a control device (not illustrated) operating for instance with electric contacts, verifies that the three male dies are correctly stripped and ready again to receive tubular elements.

A control station could also be provided between the telescoping and moulding stations, such control station being designed to verify that a tubular element is correctly telescoped on each of the three male dies. These control stations can be so devised, constructed and arranged as automatically to stop the machine in the case of failure of either the feed or the ejection devices.

This application is a division of application Serial No. 638,792, filed February 7, 1957, and now abandoned.

It is to be understood that the invention is not limited to the manner of carrying it out described and illustrated. It could incorporate numerous modifications within the competence of a man skilled in the art, according to the applications envisaged, without thereby going beyond the scope of the invention. Thus, the telescoping method and apparatus according to the invention has been described in its application to a machine designed for integrally moulding onto tubular elements made of plastic material heads of the same material, with the aim of showing one possible concrete embodiment of the invention, but it is to be well understood that the invention concerns a method and apparatus designed to enable a flexible tubular element of any kind to be conveniently telescoped onto an appropriate mandrel-like supporting member or reception rod.

What is claimed is:

1. An apparatus comprising a support member, a housing defining a cavity supporting a tubular element and means for transferring said element from said housing on to said support member, said transfer means comprising a transfer mandrel of substantially the same diameter as that of said support member, means for axially displacing said transfer mandrel into concentric alignment with said element while the latter is in said cavity and for further axially displacing said mandrel to cause its leading end to coaxially abut an axial extremity of said support member, and means operative while said mandrel and said support member are in coaxial alignment, for sliding said element axially from said mandrel on to said support member.

2. An apparatus according to claim 1, wherein said transfer mandrel is of such a diameter as to allow free sliding movement of said tubular element thereon, while said support member has such a diameter that the tubular element may be threaded thereon with an accurate fit.

3. An apparatus according to claim 1, wherein said cavity is a slightly tapered tubular open ended cavity defined by a pair of jaw-like members, the internal diameter of the narrow lower end of said cavity being substantially equal to the external diameter of said tubular element.

4. An apparatus according to claim 1, wherein said housing includes an abutment member movable transversely of the axis of said cavity from a position in which it obstructs the exit end of said cavity to a position in which it does not so obstruct, and means for moving said abutment member from obstructing to non-obstructing position and conversely.

5. An apparatus for telescoping a flexible tubular element on to a rigid supporting mandrel, said apparatus comprising a distributing head adapted to deliver tubular elements in succession, endwise and downwards, a vertically displaceable cross-head, at least one transfer mandrel assembly extending vertically downwards from said cross-head, said supporting mandrel being mounted to extend vertically upwards beneath and in alignment with said mandrel assembly, a carriage horizontally displaceable from a position beneath said distributing head to a position beneath said transfer mandrel assembly-supporting cross-head, said carriage including at least one receiver having means forming a cavity shaped and dimensioned to receive and closely embrace a tubular element delivered thereinto by said distributing head under gravity, said carriage further including a base plate having an aperture beneath the cavity of said receiver and a movable shutter having a corresponding aperture, said shutter being displaceable from a position in which said apertures are in register to one in which they are not in register and conversely, said transfer mandrel assembly including a spring-loaded transfer mandrel slidable with respect to said cross-head axially upwards against said spring-loading, and a pusher sleeve fixed to said cross-head and closely surrounding said transfer mandrel in sliding relationship therewith, the external diameter of said transfer mandrel being substantially the same as that of said supporting mandrel and substantially equal to the internal diameter of said tubular element, and said transfer mandrel being adapted, after a tubular element has been delivered by said distributing head into said cavity to rest on said shutter (said apertures being out of register) and said carriage has then been moved into position beneath said cross-head and said shutter displaced to bring said apertures into register, and on descent of said cross-head, to enter said cavity from above, telescope itself into said tubular element and advance further, carrying said tubular element, until its leading end encounters the extremity of said supporting mandrel, further descent of said cross-head thereupon causing said pusher-sleeve to encounter the trailing end of said tubular element and cause the latter to slide off from said transfer mandrel on to said supporting mandrel.

6. Apparatus for telescoping a flexible tubular element on to a rigid supporting mandrel, in which said mandrel is mounted to extend vertically upwards, said apparatus comprising a vertically displaceable cross-head disposed above said mandrel, a transfer mandrel assembly mounted on said cross-head, a receiver assembly horizontally displaceable from a feeding position to a position above said supporting mandrel and conversely; said receiver assembly comprising a casing, a pair of jaw-like members in said casing, said jaw-members defining a vertical, open-ended, tubular cavity tapering from above downwards, whose normal minimum diameter will just allow one of said tubular elements to enter without forcing, said pair of jaw-members being mounted in the casing with some freedom to spread laterally, spring means resisting such lateral spreading of the jaw-members, and an apertured shutter horizontally slidable in the casing below the jaw-members from a position in which it obstructs the lower open end of said cavity to one in which it exposes said lower open end; said transfer mandrel assembly comprising a pusher sleeve fixed to and extending downwards from said cross-head in axial alignment with said supporting mandrel, the outside diameter of said sleeve being less than the maximum but greater than the minimum diameter of said tapering, tubular cavity, a transfer mandrel slidable in said sleeve and normally extending downwardly therefrom, the outside diameter of said transfer mandrel being substantially equal to that of said supporting mandrel and its extremity being seatable on the upper end of said supporting mandrel on lowering said cross-head, and spring means resisting telescoping of said transfer mandrel into said sleeve; and means for feeding said tubular elements, one at a time, endwise by gravity into the tapering tubular cavity between the jaw-members of said receiver means when in feeding position.

7. Apparatus as defined in claim 6, in which there are a number of supporting mandrels, said receiver assembly has a like number of pairs of jaw-like members and said cross-head carries a like number of transfer mandrel assemblies respectively aligned with said supporting mandrels.

8. Apparatus as defined in claim 6, in which said transfer mandrel comprises a hollow tube, a supporting mandrel contacting ferrule with tapered extremity slidable in said tube between an extended position and a retracted position in which it is wholly received into said tube, said ferrule having the same maximum diameter as said tube, and said tube and said ferrule having interengaging longitudinal slots and ribs which together present a smooth external surface, and spring means urging said ferrule to extended position.

9. Apparatus as defined in claim 8, in which the extremity of said supporting mandrel is formed with a central projection, said ferrule having a corresponding central recess adapted to receive said projection.

10. For embodiment in an apparatus for telescoping a short length of flexible tubing on to a supporting mandrel, a transfer device comprising a displaceable cross-head and a transfer mandrel assembly mounted thereon to extend in the direction of displacement of said cross-head, said assembly comprising a pusher-sleeve fixed to said cross-head, a tube slidable in said sleeve, spring means resisting retraction of said tube within said sleeve, abutment means limiting extension of said tube from said sleeve, a ferrule having a body of constant cross-section and a tapered extremity, said ferrule and the extremity of said tube having complementary longitudinal slots and ribs enabling said ferrule to be completely retracted slidably into said tube with its ribs peripherally filling the slots of the tube to present an unbroken cylindrical surface, spring means resisting retraction of said ferrule into said tube, a rod attached to said ferrule and extending coaxially within said tube, and abutment means mounted on said rod and said tube for limiting the extension of said ferrule from said tube.

11. For embodiment in an apparatus for telescoping a short length of flexible tubing on a supporting mandrel, a receiver assembly comprising a horizontally displaceable carriage having a base and side members, a pair of jaw-holders loosely mounted in said carriage and having dowel-holes therein, spring-loaded dowels mounted on the side members of said carriage and adapted to enter said dowel-holes to locate said jaw-holders and resiliently resist spreading apart thereof, at least one pair of jaw-members mounted in said jaw-holders and defining an open-ended, vertical tubular cavity tapering from above downwards, a single vertically withdrawable screw securing the upper end of each jaw-member to the corresponding jaw-holder, a single headed plug secured to the lower part of each jaw-member to project laterally therefrom, a vertical T-slot in each jaw-holder adapted to receive slidably the head of said plug, the base of said carriage having at least one opening, said opening being located beneath the lower end of said cavity, a shutter slidable on the base of said carrier, said shutter having at least one opening complementary to said first-mentioned opening, spring means biasing said shutter to a position in which said complementary openings of the shutter and carrier base are out of register, said shutter having a projecting part, and a fixed abutment adapted to engage said projection on displacement of said carriage in one direction and thereby move said shutter to a position in which said complementary openings are in mutual register.

12. Apparatus for telescoping a flexible tubular element on to a rigid support comprising an axially shiftable transfer mandrel in alignment with and spaced from said rigid support, a tubular element receiver having means for laterally gripping a tube exteriorly thereof and shiftable laterally of a tube so held into a first position in alignment with and between said transfer mandrel and the rigid support and out of said first position into a loading position, means for placing a tubular element in said receiver when in said loading position, means, active when said receiver is in said first position, for extending the leading end of said transfer mandrel through said receiver and a tubular element therein and into coaxial abutment with the extremity of the rigid support, means for releasing the grip of said gripping means on said tubular element, and means for pushing the tubular element axially to slide it from the transfer mandrel and into position on the rigid support.

13. Apparatus as defined in claim 12 in which the means for pushing the tubular element axially from the transfer mandrel is a stripping ferrule slidable on the transfer mandrel, and the means for releasing the grip of the frictional gripping means includes said stripping ferrule in cooperation with and acting against appropriate guide surfaces on said frictional gripping means to spread the same.

References Cited in the file of this patent

UNITED STATES PATENTS

| | | |
|---|---|---|
| 2,266,874 | Larson | Dec. 23, 1941 |
| 2,767,932 | Valin | Oct. 23, 1956 |
| 2,776,764 | Palmleaf | Jan. 8, 1957 |
| 2,927,343 | Solderquist | Mar. 8, 1960 |